US010464591B2

(12) United States Patent
Pichonnat

(10) Patent No.: US 10,464,591 B2
(45) Date of Patent: Nov. 5, 2019

(54) AUTOMATICALLY-STOWED STEERING COLUMN ASSEMBLY

(71) Applicants: THYSSENKRUPP PRESTA AG, Eschen (LI); THYSSENKRUPP AG, Essen (DE)

(72) Inventor: Christian Pichonnat, Indianapolis, IN (US)

(73) Assignees: THYSSENKRUPP PRESTA AG, Eschen (LI); THYSSENKRUPP AG, Essen (DE)

(*) Notice: Subject to any disclaimer, the term of this patent is extended or adjusted under 35 U.S.C. 154(b) by 84 days.

(21) Appl. No.: 15/846,622

(22) Filed: Dec. 19, 2017

(65) Prior Publication Data
US 2019/0185044 A1   Jun. 20, 2019

(51) Int. Cl.
*B62D 1/19* (2006.01)
*B62D 1/185* (2006.01)

(52) U.S. Cl.
CPC ............. *B62D 1/192* (2013.01); *B62D 1/185* (2013.01)

(58) Field of Classification Search
CPC ........ B62D 1/181; B62D 1/183; B62D 1/185; B62D 1/192; B62D 1/195; B62D 1/197
See application file for complete search history.

(56) References Cited

U.S. PATENT DOCUMENTS

| | | | |
|---|---|---|---|
| 3,464,284 A | | 9/1969 | Fergle |
| 3,600,003 A | * | 8/1971 | Carey ................. B60R 21/203 |
| | | | 280/729 |
| 3,752,414 A | * | 8/1973 | Urquhart ................ B65H 75/10 |
| | | | 242/118.32 |
| 3,791,233 A | * | 2/1974 | Bane ....................... B62D 1/197 |
| | | | 74/2 |
| 3,988,027 A | * | 10/1976 | Serizawa ............... B62D 1/197 |
| | | | 280/777 |
| 4,397,308 A | * | 8/1983 | Hepburn ................ A61F 5/0102 |
| | | | 602/16 |
| 4,703,827 A | * | 11/1987 | Vollmer ................. B62D 1/197 |
| | | | 180/232 |

(Continued)

FOREIGN PATENT DOCUMENTS

| | | |
|---|---|---|
| DE | 3805869 A1 | 11/1989 |
| DE | 19829237 A1 * | 1/1999 ......... B60R 21/2032 |

(Continued)

OTHER PUBLICATIONS

PCT Application No. PCT/EP2018/084771, International Search Report and Written Opinion, dated Apr. 4, 2019, 13 pages.

*Primary Examiner* — Laura Freedman
(74) *Attorney, Agent, or Firm* — Lathrop Gage, L.L.P.

(57) ABSTRACT

One steering column assembly for use with a vehicle includes a jacket, a steering shaft rotatably supported by the jacket, and a retractor for moving the steering shaft from an extended position to a stowed position. The retractor does not interfere with rotation of the steering shaft when the steering shaft is at the extended position, and the retractor includes explosive material and a detonation device. The detonation device is in communication with the explosive material for detonating the explosive material when an impact event is sensed or predicted, and detonation of the explosive material results in the steering shaft moving from the extended position to the stowed position.

10 Claims, 7 Drawing Sheets

(56) References Cited

U.S. PATENT DOCUMENTS

| | | | | |
|---|---|---|---|---|
| 4,941,679 A * | 7/1990 | Baumann | B62D 1/181 | 280/775 |
| 4,968,058 A * | 11/1990 | Jones | B62D 1/197 | 280/777 |
| 5,054,810 A * | 10/1991 | Backhaus | B60R 21/33 | 180/274 |
| 5,295,712 A * | 3/1994 | Omura | B60R 21/203 | 280/731 |
| 5,482,320 A * | 1/1996 | Passebecq | B62D 1/197 | 280/777 |
| 5,488,757 A * | 2/1996 | Cohen | E05F 1/1075 | 16/280 |
| 5,769,454 A * | 6/1998 | Duval | B62D 1/197 | 280/777 |
| 5,893,580 A * | 4/1999 | Hoagland | B60R 21/2032 | 280/731 |
| 5,984,355 A * | 11/1999 | Meidanis | B62D 1/197 | 280/777 |
| 6,227,571 B1 * | 5/2001 | Sheng | B62D 1/197 | 280/731 |
| 6,244,128 B1 * | 6/2001 | Spencer | B62D 1/184 | 280/753 |
| 6,305,711 B1 * | 10/2001 | Steffens, Jr. | B60R 21/205 | 280/731 |
| 6,634,250 B2 * | 10/2003 | Schroter | B62D 1/192 | 188/268 |
| 7,048,306 B2 * | 5/2006 | Riefe | B62D 1/181 | 280/777 |
| 7,080,855 B2 * | 7/2006 | Muller | B60R 21/203 | 280/777 |
| 7,093,730 B2 * | 8/2006 | Saint-Gerand | B66C 23/348 | 212/295 |
| 7,165,786 B1 * | 1/2007 | Sha | B62D 1/184 | 280/775 |
| 7,185,918 B2 * | 3/2007 | Riefe | B60R 21/09 | 280/777 |
| 7,314,234 B2 * | 1/2008 | Muller | B60R 21/2032 | 280/777 |
| 7,604,048 B2 * | 10/2009 | Kossa | E21B 33/1292 | 166/179 |
| 7,827,880 B2 * | 11/2010 | Riefe | B62D 1/195 | 280/777 |
| 7,905,518 B2 * | 3/2011 | Geibel | B62D 1/192 | 280/777 |
| 8,474,869 B2 | 7/2013 | Sulser et al. | | |
| 9,630,644 B2 | 4/2017 | Soderlind | | |
| 9,994,178 B2 * | 6/2018 | Paxton | B62D 1/197 | |
| 2003/0006602 A1 * | 1/2003 | Waid | B62D 1/195 | 280/777 |
| 2005/0156424 A1 * | 7/2005 | Muller | B21C 23/142 | 280/777 |
| 2009/0020996 A1 | 1/2009 | Geibel et al. | | |

FOREIGN PATENT DOCUMENTS

| | | | | |
|---|---|---|---|---|
| DE | 19844412 A1 * | 7/1999 | | B60R 21/2032 |
| EP | 0454990 A1 * | 11/1991 | | |
| FR | 2705635 A1 * | 12/1994 | | B62D 1/197 |
| FR | 2845446 A1 * | 4/2004 | | B62D 1/195 |
| JP | 06255497 A * | 9/1994 | | |
| JP | 2006111094 A * | 4/2006 | | |
| WO | 97/25237 A1 | 7/1997 | | |
| WO | WO-9958389 A1 * | 11/1999 | | B60R 21/2032 |

* cited by examiner

AUTOMATICALLY-STOWED STEERING COLUMN ASSEMBLY

FIELD OF THE DISCLOSURE

The disclosure relates generally to the field of steering column assemblies for motor vehicles. More specifically, the disclosure relates to adjustable steering column assemblies.

SUMMARY

The following presents a simplified summary of the disclosure in order to provide a basic understanding of some aspects of the disclosure. This summary is not an extensive overview of the disclosure. It is not intended to identify critical elements of the disclosure or to delineate the scope of the disclosure. Its sole purpose is to present some concepts of the disclosure in a simplified form as a prelude to the more detailed description that is presented elsewhere.

According to an embodiment, a steering column assembly for use with a vehicle includes a jacket, explosive material, a steering shaft rotatably supported by the jacket, and a detonation device. The steering shaft is movable from an extended position to a stowed position upon detonation of the explosive material, and the detonation device is in communication with the explosive material for detonating the explosive material when an impact event is sensed or predicted.

In an embodiment, a push plate extends from the steering shaft for receiving a force sufficient to move the steering shaft from the extended position to the stowed position.

In an embodiment, the push plate extends inside the steering shaft.

In an embodiment, the steering shaft has an end for receiving a steering wheel, and the explosive material is positioned between the push plate and the steering shaft end.

In an embodiment, the steering shaft has an end for receiving a steering wheel, and the push plate is positioned between the explosive material and the steering shaft end.

In an embodiment, a biasing member is included for imparting the force on the push plate upon detonation of the explosive material.

In an embodiment, a base is fixed relative to the jacket and an impact plate is separated from the base by an extension. The push plate is between the base and the impact plate, the biasing member is between the base and the impact plate, and detonation of the explosive material alters the extension.

In an embodiment, the base is coupled to the jacket.

In an embodiment, the biasing member is selected from the group consisting of a spring under tension and a compressed spring.

In an embodiment, the biasing member is at least one item selected from the group consisting of a mechanical spring, a gas spring, and a hydraulic spring.

In an embodiment, the push plate is annular.

In an embodiment, a steering wheel is coupled to an end of the steering shaft. The steering wheel is devoid of any airbag.

In an embodiment, the explosive material includes chemicals that, when combined together, react to produce a propulsive or shattering force.

In an embodiment, the explosive material includes pressurized gas.

In an embodiment, the explosive material is located to cause relative movement between the steering shaft and the jacket upon detonation of the explosive material.

In an embodiment, the steering column assembly includes an outer jacket telescopically supporting the jacket, and the explosive material is located to cause relative movement between the jacket and the outer jacket upon detonation of the explosive material.

In an embodiment, the steering column assembly includes a bracket operably coupling the jacket to a frame of the vehicle, and the explosive material is located to cause relative movement between the jacket and the bracket upon detonation of the explosive material.

In an embodiment, the steering column assembly includes a bracket operably coupling the jacket to a frame of the vehicle, and the explosive material is located to cause relative movement between the bracket and the frame upon detonation of the explosive material.

According to another embodiment, a steering column assembly for use with a vehicle includes a jacket, a steering shaft rotatably supported by the jacket, and a retractor for moving the steering shaft from an extended position to a stowed position. The retractor does not interfere with rotation of the steering shaft when the steering shaft is at the extended position, and the retractor includes explosive material and a detonation device. The detonation device is in communication with the explosive material for detonating the explosive material when an impact event is sensed or predicted, and detonation of the explosive material results in the steering shaft moving from the extended position to the stowed position.

In an embodiment, a steering wheel is coupled to an end of the steering shaft. The steering wheel is devoid of any airbag.

In an embodiment, the retractor includes a biasing member for moving the steering shaft from the extended position to the stowed position.

In an embodiment, the retractor includes a push plate, a base fixed relative to the jacket, and an impact plate. The push plate extends from the steering shaft for receiving a force sufficient to move the steering shaft from the extended position to the stowed position. The impact plate is separated from the base by an extension, the push plate is between the base and the impact plate, the biasing member is between the base and the impact plate, and detonation of the explosive material alters the extension.

According to still another embodiment, a method of controlling movement of a steering shaft includes first providing a steering column assembly having a jacket, explosive material, a steering shaft rotatably supported by the jacket, and a detonation device in communication with the explosive material for detonating the explosive material. The steering shaft is movable from an extended position to a stowed position upon detonation of the explosive material. The method further includes the steps of sensing or predicting an impact event and activating the detonation device to detonate the explosive material.

DETAILED DESCRIPTION

Steering column assemblies that are movable between stowed and extended positions are known in the art. For example, U.S. Pat. No. 9,630,644 to Soderlind, assigned to FORD GLOBAL TECHNOLOGIES, LLC, the contents of which are hereby incorporated in their entirety by reference, discloses a steering wheel that nests within a recessed area of an instrument panel. The '644 patent uses a drive motor to move the steering wheel between nested and extended positions. In non-autonomous vehicles, the steering wheel of the '644 patent is nested when a driver is not in control and extended when a driver is in control. And in autonomous vehicles, the steering wheel of the '644 patent is nested when the vehicle is operating autonomously and extended upon the vehicle identifying a possible impact "in case the airbags need to be deployed or the vehicle operator needs to override the system for an evasive maneuver." Accordingly, the '644 patent uses the airbag in the steering wheel for occupant safety, regardless of whether the vehicle is operating autonomously or under the control of the occupant (or "driver"). Relying on the steering wheel to be extended in a crash (or "impact") situation may not be ideal, however. And steering-wheel airbags and steering-column devices used to absorb energy (for example, such as set forth in U.S. Pat. No. 8,474,869 to Sulser, assigned to THYSSENKRUPP PRESTA AKTIENGESELLSCHAFT, the contents of which are incorporated herein in their entirety by reference), which may be desirable for non-stowing steering column assemblies, may undesirably complicate (and increase manufacturing costs for) steering column assemblies that are movable between stowed and extended positions.

Figure 1:
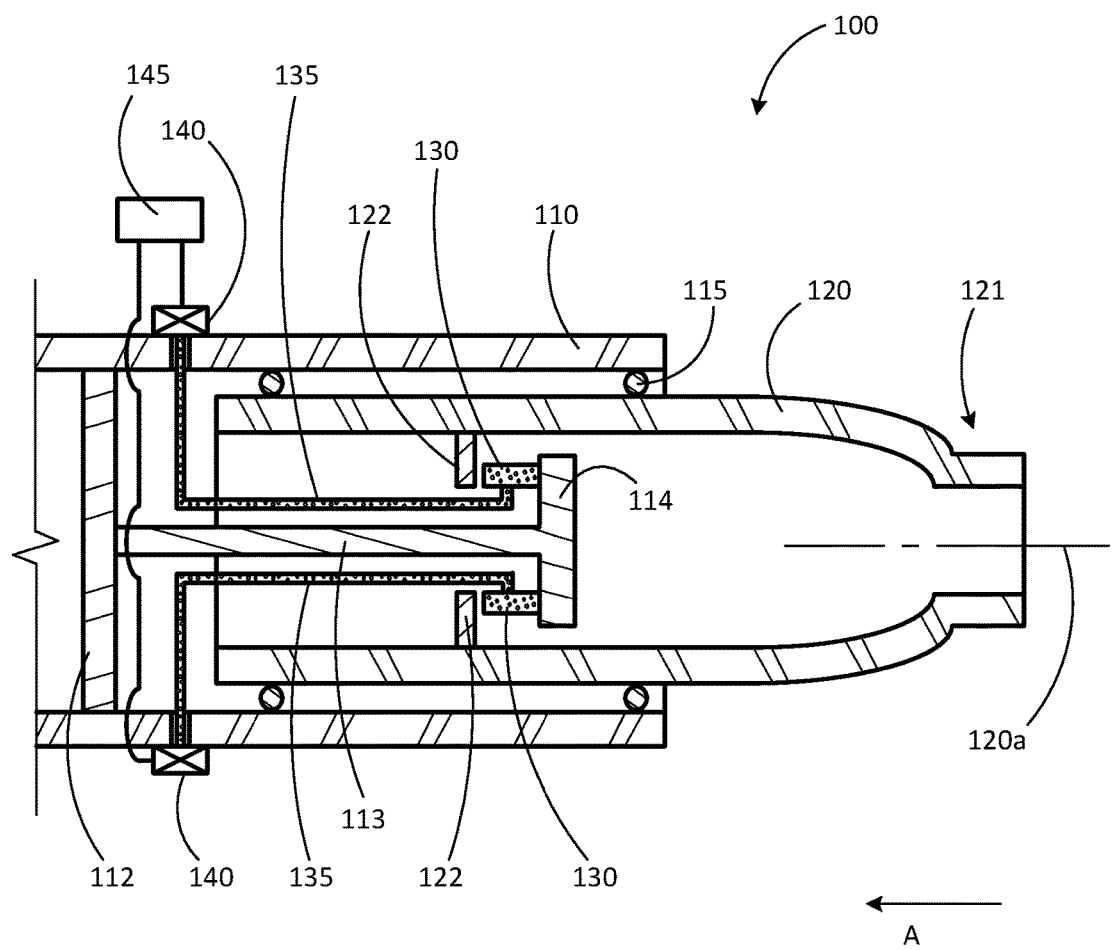
FIG. 1 is a section view showing an automatically-stowed steering column assembly, according to an embodiment of the present disclosure.

FIG. 1 illustrates an automatically-stowed steering column assembly 100, according to one embodiment. The steering column assembly 100 broadly includes a jacket 110 rotatably supporting a steering shaft (or "spindle") 120 about a longitudinal axis 120a of the steering shaft 120, such as through bearings 115. A steering wheel is coupled (directly or indirectly) to end 121 of the steering shaft 120, and rotation of the steering wheel causes the steering shaft 120 to rotate—which ultimately causes an automobile having the steering column assembly 100 to turn. The jacket 110 may be (directly or indirectly, such as through an outer jacket) fastened to a bracket coupled to the vehicle's chassis or other environmental structure, and may be allowed to tilt and lock relative to the bracket; accordingly, a driver may be able to incline the steering wheel in accordance with his preferences, though only along a predetermined range of motion.

Instead of relying on airbags in the steering wheel and energy-absorbing structure in the steering column for safety, and thus extending the steering wheel (and the steering shaft 120) toward the occupant in anticipation of a crash situation, the steering column assembly 100 does the opposite. Airbags may be omitted from the steering wheel, energy-absorbing structure may be omitted from the steering column, and the steering shaft 120 (and thus the steering wheel) is automatically moved to a stowed position upon sensing or anticipating a crash situation. Other safety devices, such as airbags not housed in the steering wheel, may passively restrain the occupant.

The steering shaft 120 is allowed to operate without interference before an impact situation is sensed or predicted. And to automatically move the steering shaft 120 to the stowed position, the steering column assembly 100 includes a controlled explosive system which causes or allows the steering shaft 120 to travel to the stowed position (i.e., to move in direction A away from the vehicle's passenger cabin). More specifically, the steering column assembly 100 has a base 112 coupled to the jacket 110 (such as by welding, pins, or other fasteners), a support plate 114, and an extension 113 separating the support plate 114 from the base 112. The base 112, the extension 113, and the support plate 114 may be integrally formed or coupled together, and in some embodiments the jacket 110 and the base 112 are integrally formed. A push plate 122 extends from the steering shaft 120, and explosive material 130 is positioned between the support plate 114 and the push plate 122.

The explosive material 130 may take various forms, and "explosive material" is used herein to refer to one or more substance capable of producing a sufficient propulsive or shattering force. For example, the explosive material may be chemicals (in solid, liquid, or gaseous state) that, when combined together, provide an appropriate reaction, or may be pressurized gas in a container capable of being ruptured or which is otherwise selectively released.

At least one detonation device (for example, a wick, an electrical lead, et cetera) 135 connects the explosive material 130 to at least one actuator 140, and the actuator 140 is in communication with a controller 145. In some embodiments, the actuator 140 and the controller 145 may be combined into one device. Alternately, the actuator 140 and/or the controller 145 may each or collectively be a distributed device such that one portion of the device is physically separate from another portion of the device; in other words, discrete devices may be linked together (e.g., over a network, over two separate networks, et cetera) and collectively form the actuator 140 and/or the controller 145. By making the controller 145 two separate controllers, additional safety benefits may result. For example, this arrangement may better avoid unintended or undesirable detonation, better ensure desirable detonation, and meet the requirements of Automotive Safety Integrity Level (ASIL) defined by the ISO 26262. It may be desirable for embodiments to fulfill the requirements of ASIL C or higher. Sensing and predicting impact situations is well known in the art and constantly improving, and any such sensing and/or predicting, whether now known or later developed, may be used with the controller 145.

When the controller 145 determines that the steering shaft 120 should be moved to the stowed position, the controller 145 causes the actuator 140 to detonate the explosive material 130 via the detonation device 135. Detonation of the explosive material 130 imparts a force on the push plate 122, causing the push plate 122 (and thus the steering shaft 120) to move in the direction A. Materials and dimensions of the base 112, the extension 113, and the support plate 114 are selected to remain generally intact and stationary throughout the detonation, and the amount and type of explosive material 130 is selected to achieve a desired amount of travel by the steering shaft 120. It may be desirable for the detonation to move the steering shaft 120 to the stowed position within three milliseconds of the controller 145 sensing or predicting an impact situation, and it may be particularly desirable for the detonation to move the steering shaft 120 to the stowed position within one millisecond of the controller 145 sensing or predicting an impact situation.

Those skilled in the art will appreciate that various elements of the embodiment 100 may be annular or may be repeated if desired. For example, the push plate 122 may be a single annular push plate 122, or one or more non-annular push plate 122 may be included.

Figure 2A:
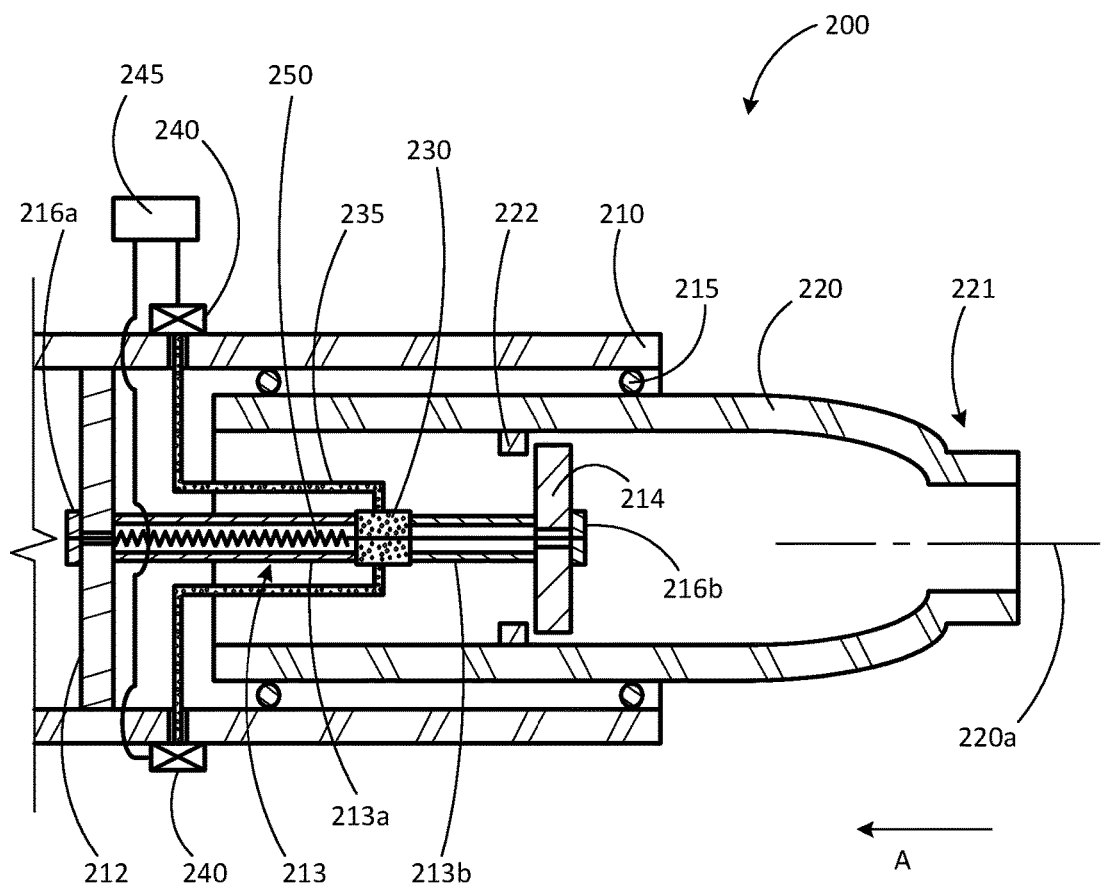
FIG. 2A is a section view showing an automatically-stowed steering column assembly, according to another embodiment of the present disclosure.

FIG. 2A illustrates another automatically-stowed steering column assembly 200 that is substantially similar to the embodiment 100, except as specifically noted and/or shown, or as would be inherent. Further, those skilled in the art will appreciate that the embodiment 100 (and thus the embodiment 200) may be modified in various ways, such as through incorporating all or part of any of the various described embodiments, for example. For uniformity and brevity, reference numbers from 200 to 299 may be used to indicate elements corresponding to those discussed above numbered from 100 to 199 (e.g., jacket 210 corresponds generally to the jacket 110, base 212 corresponds generally to the base 112, extension 213 corresponds generally to the extension 113, bearings 215 correspond generally to the bearings 115, steering shaft 220 corresponds generally to the steering shaft 120, axis 220a corresponds generally to the axis 120a, end 221 corresponds generally to the end 121, push plate 222 corresponds generally to the push plate 122, explosive material 230 corresponds generally to the explosive material 130, detonation device 235 corresponds generally to the detonation device 135, actuator 240 corresponds generally to the actuator 140, controller 245 corresponds generally to the controller 145, et cetera), though with any noted, shown, or inherent deviations.

In embodiment 200, the primary difference from the embodiment 100 is how the explosive material 230 is used compared to the explosive material 130, and the resulting structural differences. In the embodiment 100, forces from detonating the explosive device 130 cause the steering shaft 120 to move in the direction A to the stowed position. But in the embodiment 200, detonating the explosive material 230 allows a biasing member 250 (such as a mechanical spring, a gas spring, a hydraulic spring, et cetera) to move the steering shaft 220 in the direction A to a stowed position. As with the steering shaft 120, the steering shaft 220 may rotate without obstruction under normal operation.

An impact plate 214 is spaced apart from the base 212 by the extension 213, and the biasing member 250 is shown under tension, coupled to the base 212 and to the impact plate 214 by nuts or other anchor members 216a, 216b (though any appropriate fastening method may be used, such as welding, bolting, adhering, et cetera). The extension 213 is shown to be hollow with biasing member 250 passing through the extension 213, but other embodiments place the biasing member outside the extension 213.

Figure 2B:
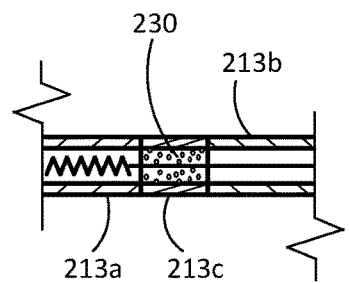
FIG. 2B is a section view showing an alternate arrangement for select elements of the automatically-stowed steering column assembly of FIG. 2A.

The explosive material 230 may form part of the extension 213 (as shown in FIG. 2A), along with portions 213a, 213b, such that detonation of the explosive material 230 causes a void where the explosive material 230 was previously located (before being detonated). Alternately, as shown in FIG. 2B, the explosive material 230 may be positioned to rupture a portion 213c of the extension 213, such that detonation of the explosive material 230 causes a void where the portion 213c was previously located (before being ruptured). The primary difference between the arrangement in FIG. 2A and the arrangement in FIG. 2B is whether the explosive material 230 forms part of the structural support separating the impact plate 214 from the base 212.

In use, when the controller 245 determines that the steering shaft 220 should be moved to the stowed position, the controller 245 causes the actuator 240 to detonate the explosive material 230 via the detonation device 235. Detonation of the explosive material 230 causes a void in the extension 213, allowing the biasing member 250 to pull the impact plate 214 toward the base 212. The impact plate 214 in turn contacts the push plate 222, forcing the push plate 222 (and thus the steering shaft 220) to move in the direction A. The explosive material 230 is selected and positioned to ensure that the void created in the extension 213 upon detonation is sufficiently large to allow the steering shaft 220 to move to the stowed position. And materials and dimensions of the base 212, the extension 213, the impact plate 214, and the biasing member 250 may be selected to withstand the explosive and impact forces encountered during use, and to timely achieve the desired amount of travel. As with the embodiment 100, it may be desirable for the steering shaft 220 to move to the stowed position within three milliseconds of the controller 245 sensing or predicting an impact situation, and it may be particularly desirable for the steering shaft 220 to move to the stowed position within one millisecond of the controller 245 sensing or predicting an impact situation.

Figure 3:
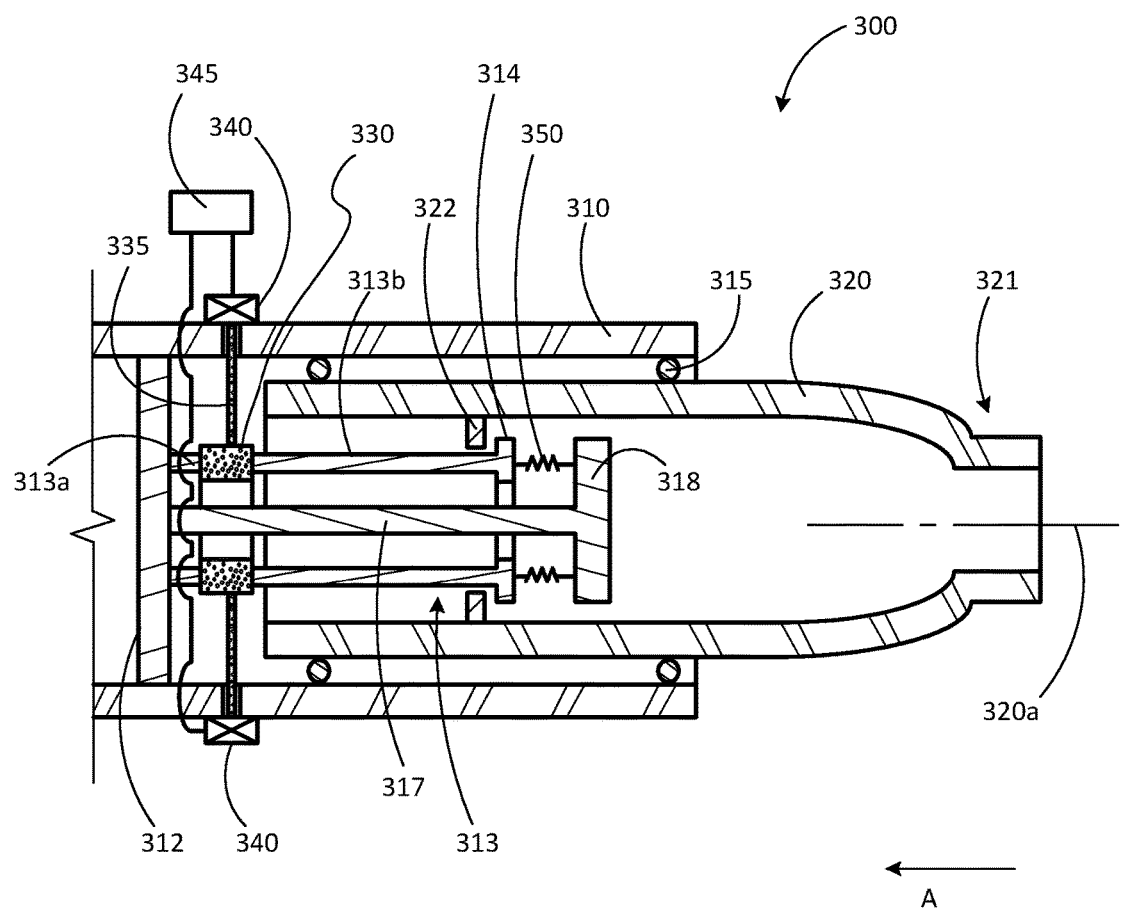
FIG. 3 is a section view showing an automatically-stowed steering column assembly, according to still another embodiment of the present disclosure.

FIG. 3 illustrates another automatically-stowed steering column assembly 300 that is substantially similar to the embodiment 200, except as specifically noted and/or shown, or as would be inherent. Further, those skilled in the art will appreciate that the embodiment 200 (and thus the embodiment 300) may be modified in various ways, such as through incorporating all or part of any of the various described embodiments, for example. For uniformity and brevity, reference numbers from 300 to 399 may be used to indicate elements corresponding to those discussed above numbered from 200 to 299 (e.g., jacket 310 corresponds generally to the jacket 210, base 312 corresponds generally to the base 212, extension 313 corresponds generally to the extension 213, impact plate 314 corresponds generally to the impact plate 214, bearings 315 correspond generally to the bearings 215, steering shaft 320 corresponds generally to the steering shaft 220, axis 320a corresponds generally to the axis 220a, end 321 corresponds generally to the end 221, push plate 322 corresponds generally to the push plate 222, explosive material 330 corresponds generally to the explosive material 230, detonation device 335 corresponds generally to the detonation device 235, actuator 340 corresponds generally to the actuator 240, controller 345 corresponds generally to the controller 245, biasing member 350 corresponds generally to the biasing member 250, et cetera), though with any noted, shown, or inherent deviations.

In embodiment 300, the primary difference from the embodiment 200 is that the biasing member 350 is compressed (instead of being in tension) until the steering shaft 320 is moved to the stowed position, and the resulting structural differences. A support plate 318 is spaced apart from the base 312 by bracing 317, and the biasing member 350 is positioned (in compression) between the support plate 318 and the impact plate 314.

As with the explosive material 230 and the extension 213, the explosive material 330 may form a structural part of the extension 313, along with portions 313a, 313b, such that detonation of the explosive material 330 causes a void whether the explosive material 330 was previously located (before being detonated); or the explosive material 330 may be positioned to rupture a structural portion of the extension 313, such that detonation of the explosive material 330 causes a void where that structural portion of the extension 313 was previously located (before being ruptured).

In use, when the controller 345 determines that the steering shaft 320 should be moved to the stowed position, the controller 345 causes the actuator 340 to detonate the explosive material 330 via the detonation device 335. Detonation of the explosive material 330 causes a void in the extension 313, allowing the biasing member 350 to push the impact plate 314 toward the base 312. The impact plate 314 in turn contacts the push plate 322, forcing the push plate 322 (and thus the steering shaft 320) to move in the direction A. The explosive material 330 is selected and positioned to ensure that the void created in the extension 313 upon detonation is sufficiently large to allow the steering shaft 320 to move to the stowed position. And materials and dimensions of the base 312, the extension 313, the impact plate 314, the bracing 317, the support plate 318, and the biasing member 350 may be selected to withstand the explosive and impact forces encountered during use, and to timely achieve the desired amount of travel. As with the embodiment 200, it may be desirable for the steering shaft 320 to move to the stowed position within three milliseconds of the controller 345 sensing or predicting an impact situation, and it may be particularly desirable for the steering shaft 320 to move to the stowed position within one millisecond of the controller 345 sensing or predicting an impact situation.

Embodiments 100, 200, and 300 described above provide for movement of spindles 120, 220, 320 relative to respective jackets 110, 210, 310. In other embodiments, the movement of the spindle (and thus the steering wheel) may be achieved in other ways—for example, by moving the jacket relative to another (outer) jacket, by moving the jacket relative to the bracket, or by moving the bracket relative to the vehicle frame.

Figure 4:
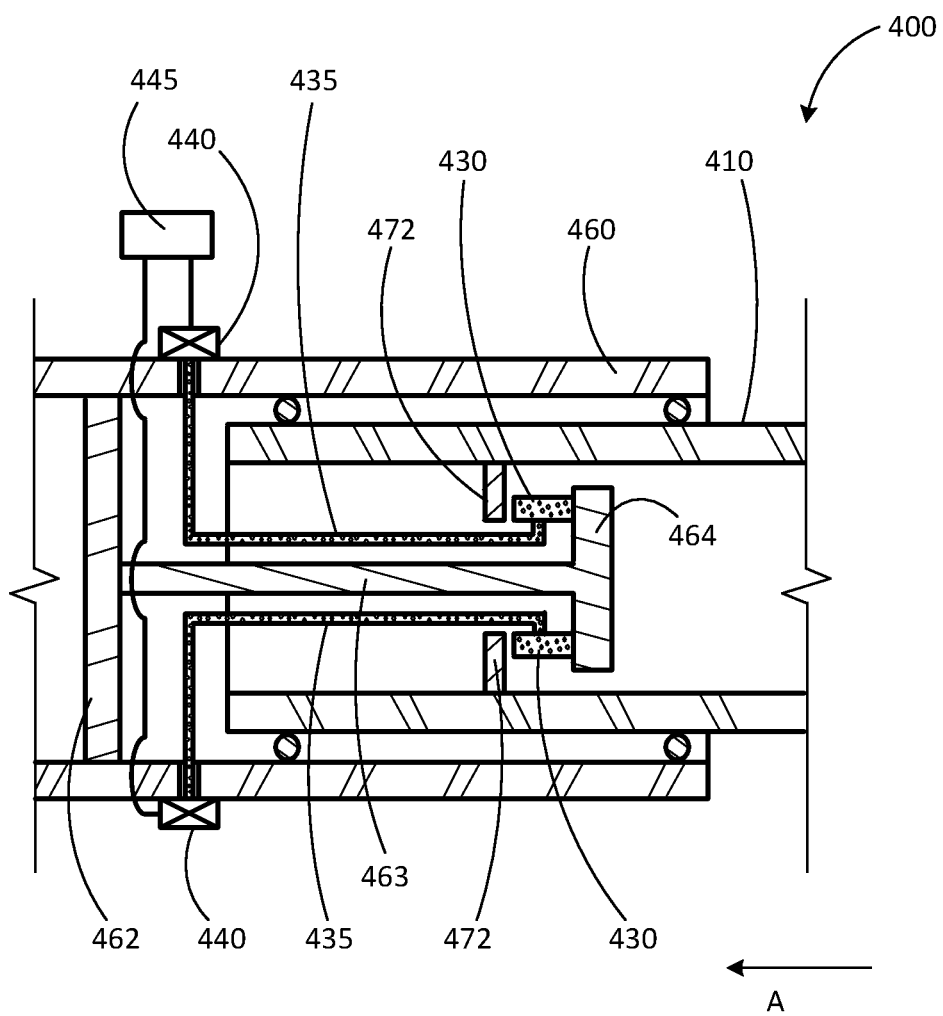
FIG. 4 is a section view showing an automatically-stowed steering column assembly, according to yet another embodiment of the present disclosure.

FIG. 4 illustrates an automatically-stowed steering column assembly 400, according to another embodiment. The embodiment 400 is similar to the embodiment 100, except that stowage is achieved by moving the jacket relative to an outer jacket (instead of by moving the spindle relative to the jacket).

The steering column assembly 400 broadly includes a jacket 410 for rotatably supporting a steering shaft (or "spindle") about a longitudinal axis of the steering shaft, such as through bearings. A steering wheel is coupled (directly or indirectly) to an end of the steering shaft, and rotation of the steering wheel causes the steering shaft to rotate—which ultimately causes an automobile having the steering column assembly 400 to turn. The jacket 410 is telescopically supported by an outer (or "lower") jacket 460, which is in turn fastened (directly or indirectly) to a bracket coupled to the vehicle's chassis or other environmental structure, and which may be allowed to tilt and lock relative to the bracket; accordingly, a driver may be able to incline the steering wheel in accordance with his preferences, though only along a predetermined range of motion.

As with the embodiments 100, 200, and 300, airbags may optionally be omitted from the steering wheel, energy-absorbing structure may be omitted from the steering column, and the steering shaft (and thus the steering wheel) is automatically moved to a stowed position upon sensing or anticipating a crash situation. Other safety devices, such as airbags not housed in the steering wheel, may passively restrain the occupant.

The jacket (or "inner jacket") 410 is allowed to operate without interference before an impact situation is sensed or predicted. And to automatically move the steering shaft (and ultimately the steering wheel) to the stowed position, the steering column assembly 400 includes a controlled explosive system which causes or allows the steering inner jacket 410 to travel to the stowed position (i.e., to move in direction A away from the vehicle's passenger cabin). More specifically, the steering column assembly 400 has a base 462 coupled to the outer jacket 460 (such as by welding, pins, or other fasteners), a support plate 464, and an extension 463 separating the support plate 464 from the base 462. The base 462, the extension 463, and the support plate 464 may be integrally formed or coupled together, and in some embodiments the outer jacket 460 and the base 462 are integrally formed. A push plate 472 extends from the inner jacket 410, and explosive material 430 is positioned between the support plate 464 and the push plate 472.

The explosive material 430 may take various forms, and "explosive material" is used herein to refer to one or more substance capable of producing a sufficient propulsive or shattering force. For example, the explosive material may be chemicals (in solid, liquid, or gaseous state) that, when combined together, provide an appropriate reaction, or may be pressurized gas in a container capable of being ruptured or which is otherwise selectively released.

At least one detonation device (for example, a wick, an electrical lead, et cetera) 435 connects the explosive material 430 to at least one actuator 440, and the actuator 440 is in communication with a controller 445. In some embodiments, the actuator 440 and the controller 445 may be combined into one device. Alternately, the actuator 440 and/or the controller 445 may each or collectively be a distributed device such that one portion of the device is physically separate from another portion of the device; in other words, discrete devices may be linked together (e.g., over a network, over two separate networks, et cetera) and collectively form the actuator 440 and/or the controller 445. By making the controller 445 two separate controllers, additional safety benefits may result. For example, this arrangement may better avoid unintended or undesirable detonation, better ensure desirable detonation, and meet the requirements of Automotive Safety Integrity Level (ASIL) defined by the ISO 26262. It may be desirable for embodiments to fulfill the requirements of ASIL C or higher. Sensing and predicting impact situations is well known in the art and constantly improving, and any such sensing and/or predicting, whether now known or later developed, may be used with the controller 445.

When the controller 445 determines that the steering shaft should be moved to the stowed position (via movement of the inner jacket 410), the controller 445 causes the actuator 440 to detonate the explosive material 430 via the detonation device 435. Detonation of the explosive material 430 imparts a force on the push plate 472, causing the push plate 472 (and thus the inner jacket 410 and the steering shaft) to move in the direction A. Materials and dimensions of the base 462, the extension 463, and the support plate 414 are selected to remain generally intact and stationary throughout the detonation, and the amount and type of explosive material 430 is selected to achieve a desired amount of travel by the steering shaft. It may be desirable for the detonation to move the steering shaft to the stowed position within three milliseconds of the controller 445 sensing or predicting an impact situation, and it may be particularly desirable for the detonation to move the steering shaft to the stowed position within one millisecond of the controller 445 sensing or predicting an impact situation.

Those skilled in the art will appreciate that various elements of the embodiment 400 may be annular or may be repeated if desired. For example, the push plate 472 may be a single annular push plate 472, or one or more non-annular push plate 472 may be included.

Figure 5A:
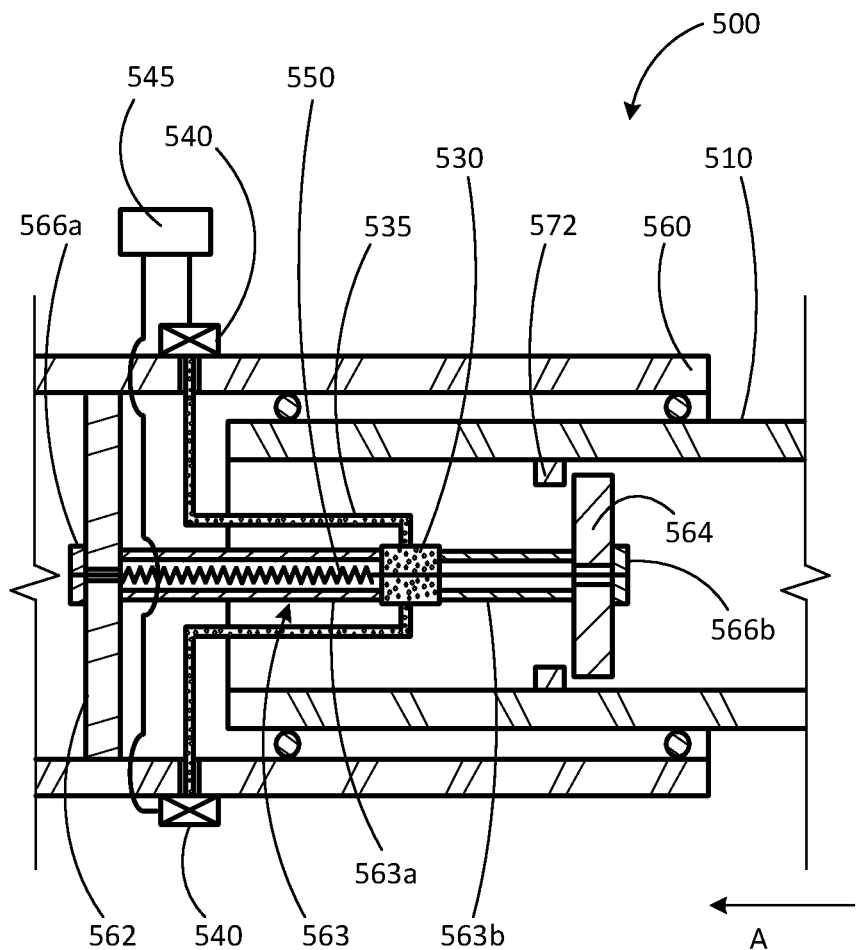
FIG. 5A is a section view showing an automatically-stowed steering column assembly, according to still yet another embodiment of the present disclosure.

FIG. 5A illustrates another automatically-stowed steering column assembly 500 that is substantially similar to the embodiment 400, except as specifically noted and/or shown, or as would be inherent. Further, those skilled in the art will appreciate that the embodiment 400 (and thus the embodiment 500) may be modified in various ways, such as through incorporating all or part of any of the various described embodiments, for example. For uniformity and brevity, reference numbers from 500 to 599 may be used to indicate elements corresponding to those discussed above numbered from 400 to 499 (e.g., jacket 510 corresponds generally to the jacket 510, outer jacket 560 corresponds generally to the outer jacket 460, base 562 corresponds generally to the base 462, extension 563 corresponds generally to the extension 463, push plate 572 corresponds generally to the push plate 472, explosive material 530 corresponds generally to the explosive material 430, detonation device 535 corresponds generally to the detonation device 435, actuator 540 corresponds generally to the actuator 440, controller 545 corresponds generally to the controller 445, et cetera), though with any noted, shown, or inherent deviations.

In embodiment 500, the primary difference from the embodiment 400 is how the explosive material 530 is used compared to the explosive material 430, and the resulting structural differences. In the embodiment 400, forces from detonating the explosive device 430 cause the steering shaft to move in the direction A to the stowed position (via movement of the inner jacket 410). But in the embodiment 500, detonating the explosive material 530 allows a biasing member 550 (such as a mechanical spring, a gas spring, a hydraulic spring, et cetera) to move the steering shaft in the direction A to a stowed position (via movement of the inner jacket 510). As with the inner jacket 410, the inner jacket 510 may move without obstruction under normal operation.

An impact plate 564 is spaced apart from the base 562 by the extension 563, and the biasing member 550 is shown under tension, coupled to the base 562 and to the impact plate 564 by nuts or other anchor members 566a, 566b (though any appropriate fastening method may be used, such as welding, bolting, adhering, et cetera). The extension 563 is shown to be hollow with biasing member 550 passing through the extension 563, but other embodiments place the biasing member outside the extension 563.

Figure 5B:
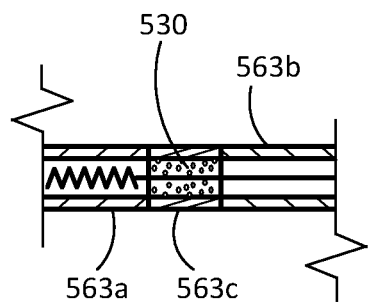
FIG. 5B is a section view showing an alternate arrangement for select elements of the automatically-stowed steering column assembly of FIG. 5A.

The explosive material 530 may form part of the extension 563 (as shown in FIG. 5A), along with portions 563a, 563b, such that detonation of the explosive material 530 causes a void where the explosive material 530 was previously located (before being detonated). Alternately, as shown in FIG. 5B, the explosive material 530 may be positioned to rupture a portion 563c of the extension 563, such that detonation of the explosive material 530 causes a void where the portion 563c was previously located (before being ruptured). The primary difference between the arrangement in FIG. 5A and the arrangement in FIG. 5B is whether the explosive material 530 forms part of the structural support separating the impact plate 564 from the base 562.

In use, when the controller 545 determines that the steering shaft should be moved to the stowed position (via movement of the inner jacket 510), the controller 545 causes the actuator 540 to detonate the explosive material 530 via the detonation device 535. Detonation of the explosive material 530 causes a void in the extension 563, allowing the biasing member 550 to pull the impact plate 564 toward the base 562. The impact plate 564 in turn contacts the push plate 572, forcing the push plate 572 (and thus the inner jacket 510 and the steering shaft) to move in the direction A. The explosive material 530 is selected and positioned to ensure that the void created in the extension 563 upon detonation is sufficiently large to allow the steering shaft to move to the stowed position. And materials and dimensions of the base 562, the extension 563, the impact plate 564, and the biasing member 550 may be selected to withstand the explosive and impact forces encountered during use, and to timely achieve the desired amount of travel. As with the embodiment 400, it may be desirable for the steering shaft to move to the stowed position within three milliseconds of the controller 545 sensing or predicting an impact situation, and it may be particularly desirable for the steering shaft to move to the stowed position within one millisecond of the controller 545 sensing or predicting an impact situation.

Figure 6:
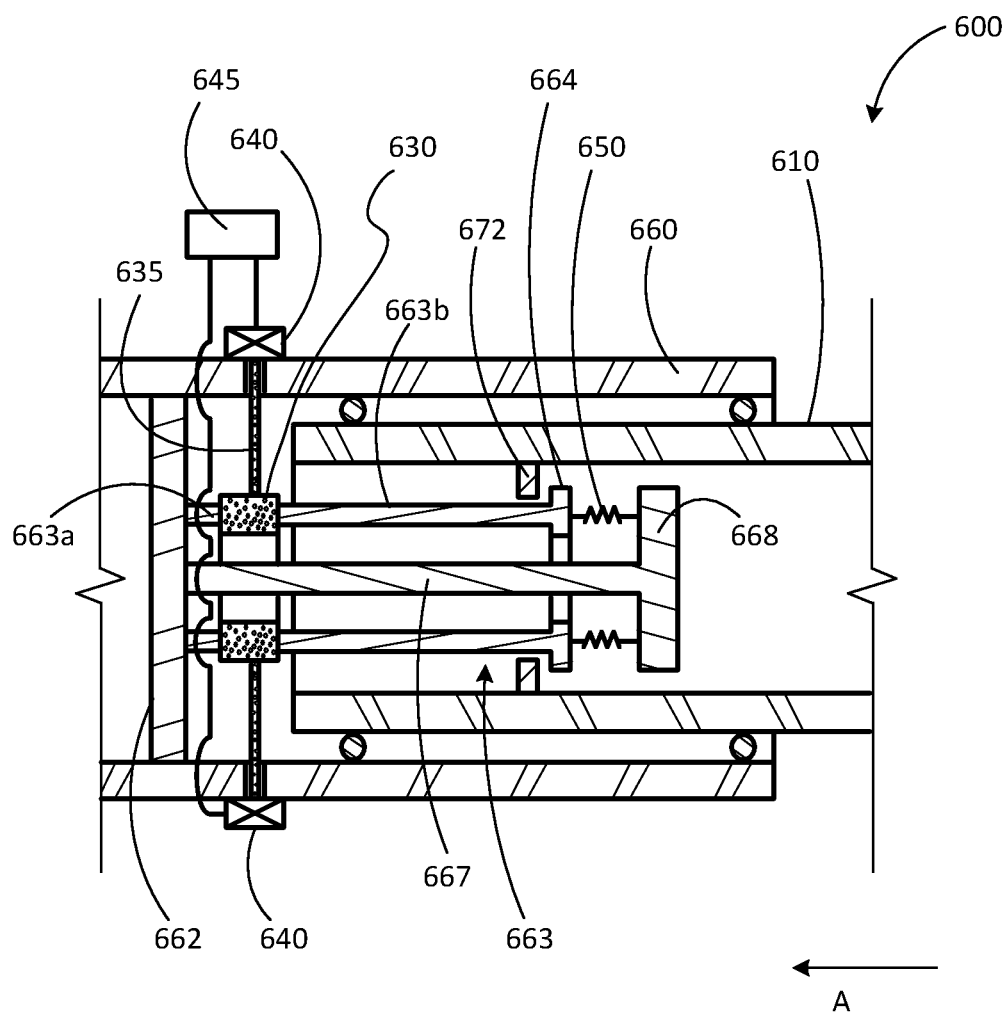
FIG. 6 is a section view showing an automatically-stowed steering column assembly, according to still another embodiment of the present disclosure.

FIG. 6 illustrates another automatically-stowed steering column assembly 600 that is substantially similar to the embodiment 500, except as specifically noted and/or shown, or as would be inherent. Further, those skilled in the art will appreciate that the embodiment 500 (and thus the embodiment 600) may be modified in various ways, such as through incorporating all or part of any of the various described embodiments, for example. For uniformity and brevity, reference numbers from 600 to 699 may be used to indicate elements corresponding to those discussed above numbered from 500 to 599 (e.g., jacket 610 corresponds generally to the jacket 510, outer jacket 660 corresponds generally to the outer jacket 560, base 662 corresponds generally to the base 562, extension 663 corresponds generally to the extension 563, impact plate 664 corresponds generally to the impact plate 564, push plate 672 corresponds generally to the push plate 572, explosive material 630 corresponds generally to the explosive material 530, detonation device 635 corresponds generally to the detonation device 535, actuator 640 corresponds generally to the actuator 540, controller 645 corresponds generally to the controller 545, biasing member 650 corresponds generally to the biasing member 550, et cetera), though with any noted, shown, or inherent deviations.

In embodiment 600, the primary difference from the embodiment 500 is that the biasing member 650 is compressed (instead of being in tension) until the steering shaft is moved to the stowed position (via movement of the inner jacket 610), and the resulting structural differences. A support plate 668 is spaced apart from the base 662 by bracing 667, and the biasing member 650 is positioned (in compression) between the support plate 668 and the impact plate 664.

As with the explosive material 530 and the extension 563, the explosive material 630 may form a structural part of the extension 663, along with portions 663a, 663b, such that detonation of the explosive material 630 causes a void whether the explosive material 630 was previously located (before being detonated); or the explosive material 630 may be positioned to rupture a structural portion of the extension 663, such that detonation of the explosive material 630 causes a void where that structural portion of the extension 663 was previously located (before being ruptured).

In use, when the controller 645 determines that the steering shaft should be moved to the stowed position (via movement of the inner jacket 610), the controller 645 causes the actuator 640 to detonate the explosive material 630 via the detonation device 635. Detonation of the explosive material 630 causes a void in the extension 663, allowing the biasing member 650 to push the impact plate 664 toward the base 662. The impact plate 664 in turn contacts the push plate 672, forcing the push plate 672 (and thus the inner jacket 610 and the steering shaft) to move in the direction A. The explosive material 630 is selected and positioned to ensure that the void created in the extension 663 upon detonation is sufficiently large to allow the steering shaft to move to the stowed position. And materials and dimensions of the base 662, the extension 663, the impact plate 664, the bracing 667, the support plate 668, and the biasing member 650 may be selected to withstand the explosive and impact forces encountered during use, and to timely achieve the desired amount of travel. As with the embodiment 500, it may be desirable for the steering shaft to move to the stowed position within three milliseconds of the controller 645 sensing or predicting an impact situation, and it may be particularly desirable for the steering shaft to move to the stowed position within one millisecond of the controller 645 sensing or predicting an impact situation.

Embodiments 100, 200, and 300 described above provide for movement of spindles 120, 220, 320 relative to respective jackets 110, 210, 310. And embodiments 400, 500, and 600 described above provide for movement of inner jackets 410, 510, 610 relative to respective outer jackets 460, 560, 660. In other embodiments, the movement of the spindle (and thus the steering wheel) may be achieved in other ways—for example, by moving the jacket relative to the bracket, or by moving the bracket relative to the vehicle frame.

Figure 7:
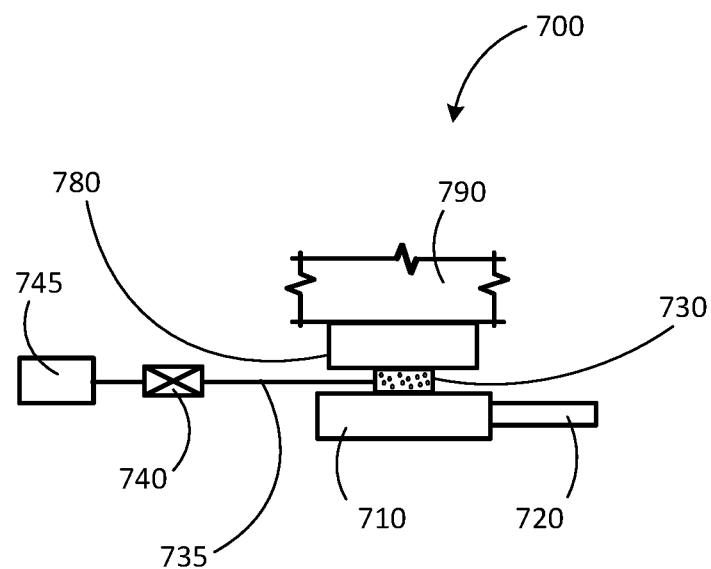
FIG. 7 is a schematic view showing an automatically-stowed steering column assembly, according to still yet another embodiment of the present disclosure.

FIG. 7 schematically illustrates an automatically-stowed steering column assembly 700, according to another embodiment. Similar to the other embodiments described herein, the embodiment 700 includes a jacket 710 rotatably supporting a steering shaft (or "spindle") 720 about a longitudinal axis of the steering shaft 720, such as through bearings. A steering wheel is coupled (directly or indirectly) to an end of the steering shaft 720, and rotation of the steering wheel causes the steering shaft 720 to rotate—which ultimately causes an automobile having the steering column assembly 700 to turn. The jacket 710 is (directly or indirectly, such as through an outer jacket) fastened to a bracket 780 coupled to the vehicle's chassis 790 or other environmental structure, and may be allowed to tilt and lock relative to the bracket 780; accordingly, a driver may be able to incline the steering wheel in accordance with his preferences, though only along a predetermined range of motion.

As with the other embodiments described herein, airbags may optionally be omitted from the steering wheel, energy-absorbing structure may be omitted from the steering column, and the steering shaft (and thus the steering wheel) is automatically moved to a stowed position upon sensing or anticipating a crash situation. Other safety devices, such as airbags not housed in the steering wheel, may passively restrain the occupant.

In the embodiment 700, explosive material 730 (which may generally correspond to the explosive material 130) is positioned such that detonation of the explosive material 730 causes the jacket 710 to move relative to the bracket 780 (e.g., through partial or full separation from the bracket 780), and ultimately move the steering shaft 720 from an extended position to a stowed position. Movement of the steering shaft 720 may occur in various directions, such as along the longitudinal axis of the steering shaft 720, linearly relative to the bracket 780, or rotationally relative to the bracket 780. If desired, a biasing member (such as a mechanical spring, a gas spring, a hydraulic spring, et cetera) may direct the movement of the jacket 710 (and thus the movement of the spindle 720).

At least one detonation device (for example, a wick, an electrical lead, et cetera) 735 connects the explosive material 730 to at least one actuator 740, and the actuator 740 is in communication with a controller 745. In some embodiments, the actuator 740 and the controller 745 may be combined into one device. Alternately, the actuator 740 and/or the controller 745 may each or collectively be a distributed device such that one portion of the device is physically separate from another portion of the device; in other words, discrete devices may be linked together (e.g., over a network, over two separate networks, et cetera) and collectively form the actuator 740 and/or the controller 745. By making the controller 745 two separate controllers, additional safety benefits may result. For example, this arrangement may better avoid unintended or undesirable detonation, better ensure desirable detonation, and meet the requirements of Automotive Safety Integrity Level (ASIL) defined by the ISO 26262. It may be desirable for embodiments to fulfill the requirements of ASIL C or higher. Sensing and predicting impact situations is well known in the art and constantly improving, and any such sensing and/or predicting, whether now known or later developed, may be used with the controller 745.

When the controller 745 determines that the steering shaft 720 should be moved to the stowed position, the controller 745 causes the actuator 740 to detonate the explosive material 730 via the detonation device 735. Detonation of the explosive material 730 causes or allows (i.e., in conjunction with a biasing member) the jacket 710 and the steering shaft 720 to move relative to the bracket 780, moving the steering shaft 720 from the extended position to the stowed position. It may be desirable for the detonation to move the steering shaft 720 to the stowed position within three milliseconds of the controller 745 sensing or predicting an impact situation, and it may be particularly desirable for the detonation to move the steering shaft 720 to the stowed position within one millisecond of the controller 745 sensing or predicting an impact situation.

Figure 8:
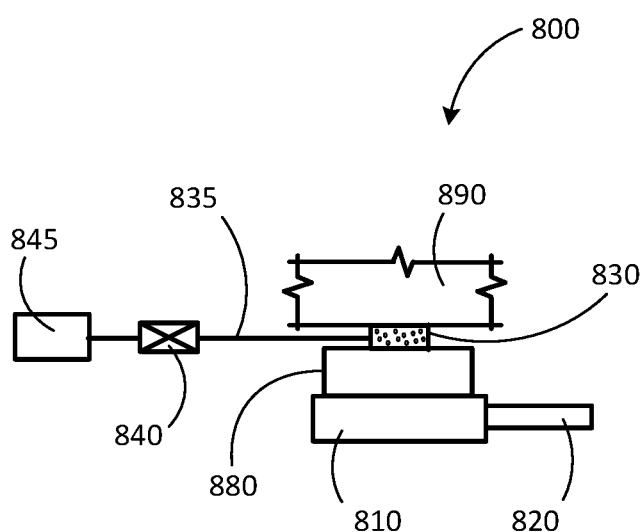
FIG. 8 is a schematic view showing an automatically-stowed steering column assembly, according to still another embodiment of the present disclosure.

FIG. 8 schematically illustrates an automatically-stowed steering column assembly 800, according to another embodiment. Similar to the other embodiments described herein, the embodiment 800 includes a jacket 810 rotatably supporting a steering shaft (or "spindle") 820 about a longitudinal axis of the steering shaft 820, such as through bearings. A steering wheel is coupled (directly or indirectly) to an end of the steering shaft 820, and rotation of the steering wheel causes the steering shaft 820 to rotate—which ultimately causes an automobile having the steering column assembly 800 to turn. The jacket 810 is (directly or indirectly, such as through an outer jacket) fastened to a bracket 880 coupled to the vehicle's chassis 890 or other environmental structure, and may be allowed to tilt and lock relative to the bracket 880; accordingly, a driver may be able to incline the steering wheel in accordance with his preferences, though only along a predetermined range of motion.

As with the other embodiments described herein, airbags may optionally be omitted from the steering wheel, energy-absorbing structure may be omitted from the steering column, and the steering shaft (and thus the steering wheel) is automatically moved to a stowed position upon sensing or anticipating a crash situation. Other safety devices, such as airbags not housed in the steering wheel, may passively restrain the occupant.

In the embodiment 800, explosive material 830 (which may generally correspond to the explosive material 130) is positioned such that detonation of the explosive material 830 causes the bracket 880 to move relative to the frame 890 (e.g., through partial or full separation from the frame 890), and ultimately move the steering shaft 820 from an extended position to a stowed position. Movement of the steering shaft 820 may occur in various directions, such as along the longitudinal axis of the steering shaft 820, linearly relative to the frame 890, or rotationally relative to the frame 890. If desired, a biasing member (such as a mechanical spring, a gas spring, a hydraulic spring, et cetera) may direct the movement of the jacket 810 (and thus the movement of the spindle 820).

At least one detonation device (for example, a wick, an electrical lead, et cetera) 835 connects the explosive material 830 to at least one actuator 840, and the actuator 840 is in communication with a controller 845. In some embodiments, the actuator 840 and the controller 845 may be combined into one device. Alternately, the actuator 840 and/or the controller 845 may each or collectively be a distributed device such that one portion of the device is physically separate from another portion of the device; in other words, discrete devices may be linked together (e.g., over a network, over two separate networks, et cetera) and collectively form the actuator 840 and/or the controller 845. By making the controller 845 two separate controllers, additional safety benefits may result. For example, this arrangement may better avoid unintended or undesirable detonation, better ensure desirable detonation, and meet the requirements of Automotive Safety Integrity Level (ASIL) defined by the ISO 26262. It may be desirable for embodiments to fulfill the requirements of ASIL C or higher. Sensing and predicting impact situations is well known in the art and constantly improving, and any such sensing and/or predicting, whether now known or later developed, may be used with the controller 845.

When the controller 845 determines that the steering shaft 820 should be moved to the stowed position, the controller 845 causes the actuator 840 to detonate the explosive material 830 via the detonation device 835. Detonation of the explosive material 830 causes or allows (i.e., in conjunction with a biasing member) the bracket 880, the jacket 810, and the steering shaft 820 to move relative to the frame 890, moving the steering shaft 820 from the extended position to the stowed position. It may be desirable for the detonation to move the steering shaft 820 to the stowed position within three milliseconds of the controller 845 sensing or predicting an impact situation, and it may be particularly desirable for the detonation to move the steering shaft 820 to the stowed position within one millisecond of the controller 845 sensing or predicting an impact situation.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the claims. The specific configurations and contours set forth in the accompanying drawings are illustrative and not limiting.

The invention claimed is:

1. A steering column assembly for use with a vehicle, comprising:
    a jacket;
    explosive material;
    a steering shaft rotatably supported by the jacket, the steering shaft being movable from an extended position to a stowed position upon detonation of the explosive material;
    a detonation device in communication with the explosive material for detonating the explosive material when an impact event is sensed or predicted; and
    a push plate extending from the steering shaft for receiving a force sufficient to move the steering shaft from the extended position to the stowed position;
    wherein the steering shaft has an end for receiving a steering wheel; and
    wherein the push plate is positioned between the explosive material and the steering shaft end.

2. The steering column assembly of claim 1, wherein the push plate extends inside the steering shaft.

3. The steering column assembly of claim 1, further comprising a biasing member for imparting the force on the push plate upon detonation of the explosive material.

4. The steering column assembly of claim 1, wherein the push plate is annular.

5. The steering column assembly of claim 1, further comprising the steering wheel coupled to the end of the steering shaft, the steering wheel being devoid of any airbag.

6. The steering column assembly of claim 1, wherein the explosive material comprises at least one of:
    (a) pressurized gas; and
    (b) chemicals that, when combined together, react to produce a propulsive or shattering force.

7. A steering column assembly for use with a vehicle, comprising:
    a jacket;
    explosive material;
    a steering shaft rotatably supported by the jacket, the steering shaft being movable from an extended position to a stowed position upon detonation of the explosive material;
    a detonation device in communication with the explosive material for detonating the explosive material when an impact even is sensed or predicted;
    a push plate extending from the steering shaft for receiving a force sufficient to move the steering shaft from the extended position to the stowed position;
    a biasing member for imparting the force on the push plate upon detonation of the explosive material;
    a base that is fixed relative to the jacket; and
    an impact plate separated from the base by an extension, the push plate being between the base and the impact plate;
    wherein the biasing member is between the base and the impact plate;

wherein detonation of the explosive material alters the extension; and wherein the impact plate strikes the push plate after detonation of the explosive material, thereby causing the push plate to move axially.

8. The steering column assembly of claim 7, wherein the base is coupled to the jacket and extends generally perpendicularly to a longitudinal axis of the steering shaft.

9. The steering column assembly of claim 7, wherein the extension passes inside the steering shaft.

10. A steering column assembly for use with a vehicle, comprising:

a jacket;

a steering shaft rotatably supported by the jacket;

a retractor for moving the steering shaft from an extended position to a stowed position, the retractor not interfering with rotation of the steering shaft when the steering shaft is at the extended position, the retractor comprising:

explosive material;

a detonation device in communication with the explosive material for detonating the explosive material when an impact event is sensed or predicted, detonation of the explosive material resulting in the steering shaft moving from the extended position to the stowed position;

a push plate extending from the steering shaft for receiving a force sufficient to move the steering shaft from the extended position to the stowed position;

a base that is fixed relative to the jacket; and an impact plate separated from the base by an extension, the push plate being between the base and the impact plate;

wherein detonation of the explosive material alters the extension; and wherein the impact plate strikes the push plate after detonation of the explosive material, thereby causing the push plate to move axially.

* * * * *